United States Patent [19]

Mannion

[11] 4,130,242
[45] Dec. 19, 1978

[54] DATA STORAGE AND RETRIEVAL SYSTEM EMPLOYING BALANCED MAGNETIC CIRCUITS

[75] Inventor: Robert S. Mannion, Carbondale, Pa.

[73] Assignee: Continental Instrument Corporation, Hicksville, N.Y.

[21] Appl. No.: 831,428

[22] Filed: Sep. 8, 1977

[51] Int. Cl.² .................. G06K 7/08; G11B 5/27; G11B 5/20
[52] U.S. Cl. .................. 235/450; 360/121; 360/123
[58] Field of Search ............ 235/380, 381, 382, 449, 235/450, 493, 494; 360/115, 119, 121, 123, 2

[56] References Cited
U.S. PATENT DOCUMENTS

| | | | |
|---|---|---|---|
| 3,290,487 | 12/1966 | Scott | 235/450 |
| 3,312,372 | 4/1967 | Cooper | 235/450 |
| 3,654,435 | 4/1972 | Vaccaro | 235/494 |
| 3,780,271 | 12/1973 | Sharkitt | 235/494 |
| 3,896,292 | 7/1975 | May | 235/450 |
| 3,985,998 | 10/1976 | Crafton | 235/380 |

Primary Examiner—Robert M. Kilgore
Attorney, Agent, or Firm—Arthur L. Plevy

[57] ABSTRACT

A data storage retrieval system includes a magnetic circuit read head which comprises first and second pole members. Located and positioned between the poles is a pickup means which comprises a magnetic member having a pickup coil associated therewith. The member as positioned between the poles is located at a point which provides zero output across the coil when the poles are excited by a source of alternating potential. A magnetic material which may be positioned on an information carrying card is positioned such that it affects the flux lines between one of the poles and said pickup means. This position of the magnetic member serves to provide a signal across the coil indicative of a binary one or a zero.

8 Claims, 7 Drawing Figures

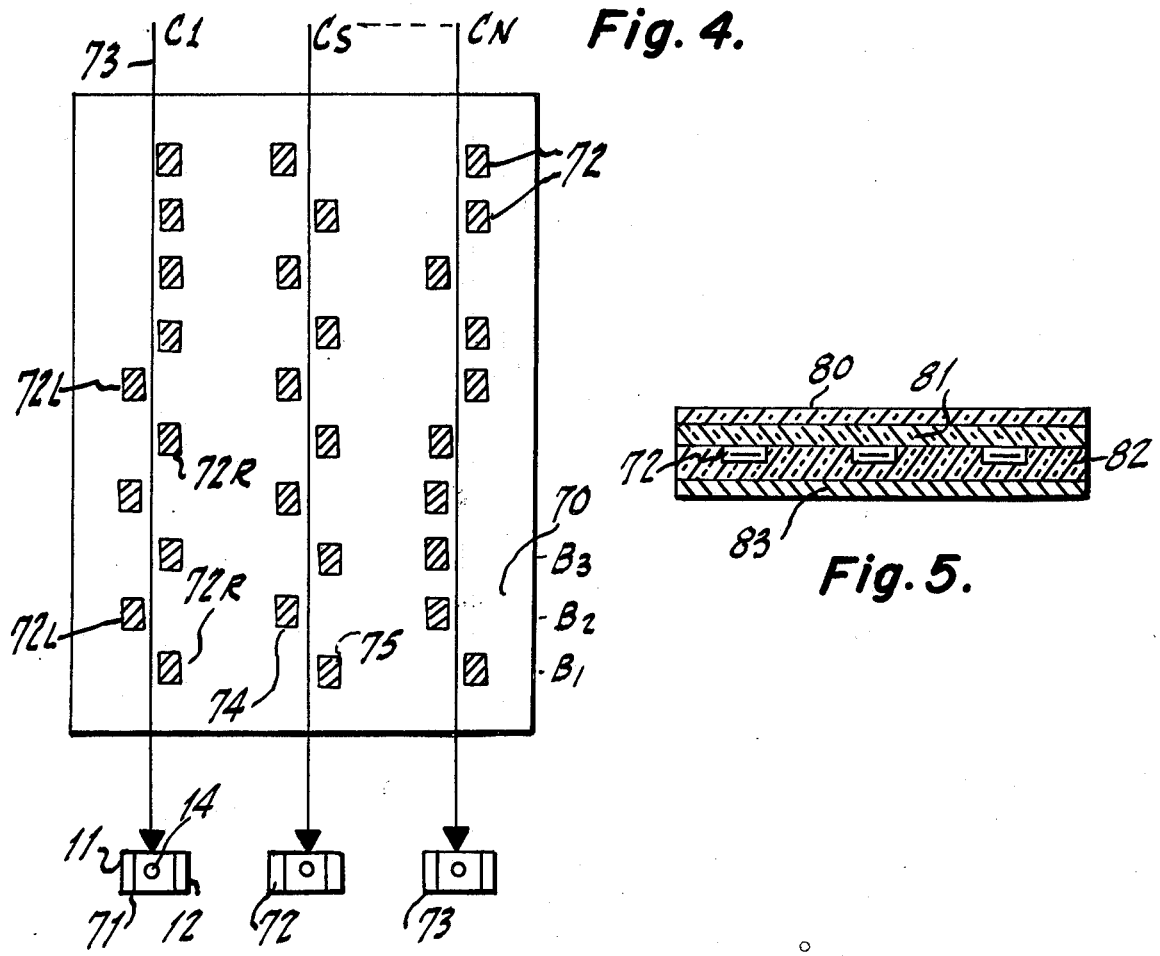
Fig. 4.
Fig. 5.
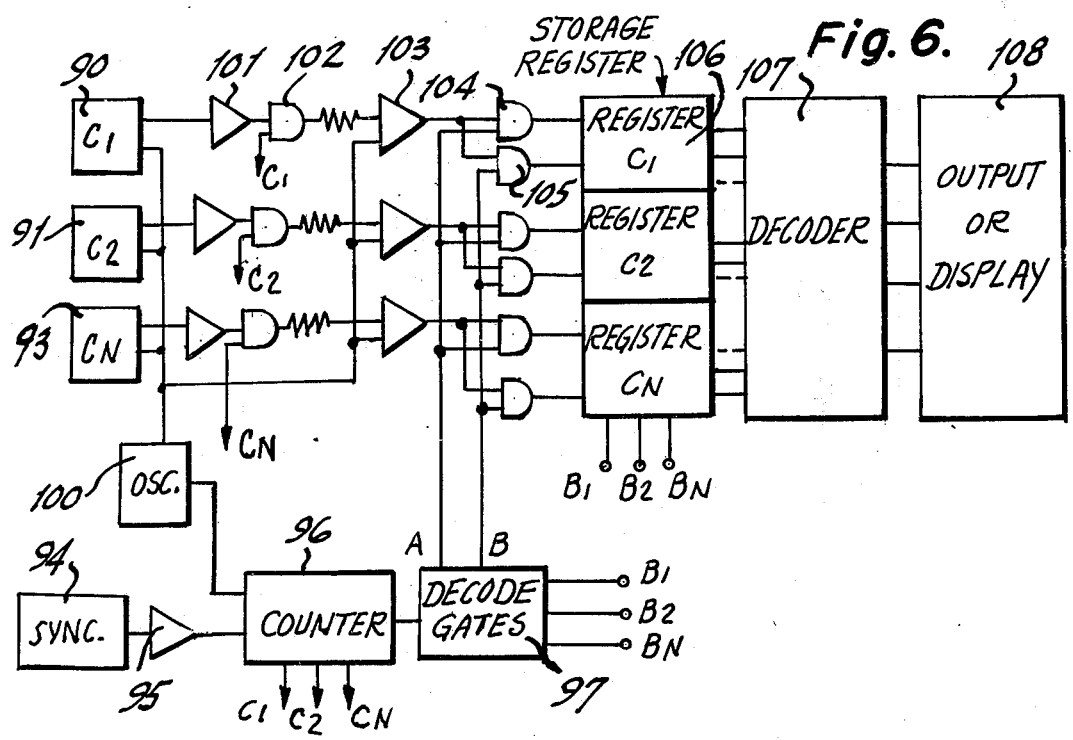
Fig. 6.

DATA STORAGE AND RETRIEVAL SYSTEM EMPLOYING BALANCED MAGNETIC CIRCUITS

BACKGROUND OF INVENTION

This invention relates to the recognition and retrieval of data on a card and more particularly to an apparatus and method for electronically reading information on a carry member where the information is arranged in a pattern of magnetic land areas.

The particular concept to be described is applicable to the credit card reading system and employs a magnetic head as an element to read magnetic information stored on a credit card.

As one can ascertain, the prior art is replete with a plethora of patents and articles denoting techniques for retrieving information stored on a credit card. Such cards have been used and are used in conjunction with identification systems, access control, security systems and have numerous other applications and utility.

Essentially, the prior art involving such systems is extremely extensive and hence, there exists numerous patents which essentially serve to read information stored on a credit card in regard to the above noted applications. Generally speaking, the prior art discloses systems which use optical techniques to read information which is optically encoded on a card in the form of punched holes or light reflecting materials and such systems are in present use.

Other systems employ displacement devices which can respond to embossed designations on a card to provide signals. Still other systems employ a magnetic stripe on a card and use magnetic heads to read digital data contained within the stripe. It would be correct to characterize these systems by saying that the approaches dictated by the prior art are numerous and that each system purports to have its own particular utility in regard to the application intended.

In any event, a majority of suitable references which concern prior art systems would be found in Class 235, sub-class 61.11 and so on.

In spite of the many systems available, there remains a need for improved operation, while maintaining an economical and reliable system. Coupled with these obvious characteristics is the further aspect of providing the ability to retrieve a large number of information bits in a reliable and efficient manner. Furthermore, a desirable feature is to enable the reading of information on a card without the card touching or otherwise contacting the reading heads or devices employed. This feature serves to prolong the life of the card as well as to preserve the read head assembly components.

It is therefore an object of the present invention to provide an improved information retrieval system which employs a magnetic read head and is particularly adapted for inclusion in a card reader application.

DESCRIPTION OF PREFERRED EMBODIMENT

Apparatus for retrieving information on an information carrying member; said carrying member having at least one magnetic land area located thereon and positioned a predetermined distance from a reference line on said member comprising a magnetic circuit having a first and a second pole separated one from the other by a given distance, means for driving said magnetic circuit to provide flux lines between said poles, pickup means positioned between said poles and located at a distance from one pole with respect to the other, said distance manifesting a position to cause said means to intercept said flux lines to cause a zero electrical signal to be developed across said means at said position and means positioning said carrying member in the proximity of said magnetic circuit to cause said magnetic land area to affect said flux lines between one of said poles and said pickup means to provide across said pickup means a signal indicative of the position of said land area with respect to said reference line.

BRIEF DESCRIPTION OF THE FIGURES

FIG. 4 is a top plan view of an information carrying card according to this invention.

FIG. 5 is a cross-sectional view of the card of FIG. 4.

FIG. 6 is a block diagram of an information card reading device according to this invention.

Before proceeding further, it is understood that the word "magnetic" as used means any material which can be magnetized such as a ferrous or ferrite material and does not imply in any manner that the magnetic material is in fact, magnetized or is a magnet.

DETAILED DESCRIPTION OF FIGURES

Figure 1:
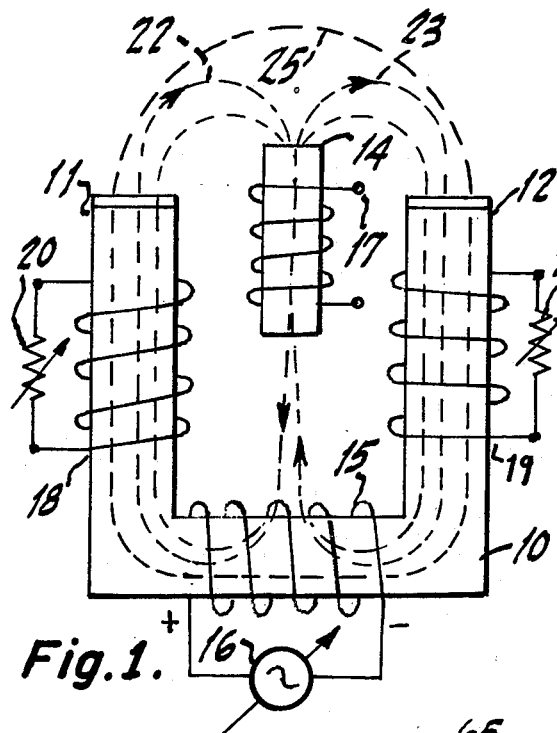
FIGS. 1 and 1A are diagrammatic views of a magnetic circuit according to this invention for providing a reading function.

Referring to FIG. 1, there is shown a read head structure employed according to this invention. Basically, the read head comprises a U-shaped member or yoke 10 which is fabricated from a magnetizable material, such as a ferromagnetic material.

In essence, as can be seen the member 10 is similar to a horse shoe configuration and possesses a left handed pole 11 and a right handed pole 12. Located between the poles is a pickup member 14. The member 14, as will be explained, is also fabricated from a magnetic material and is positioned between the poles by means of an epoxy, wax, or some other material or structure which will orient or maintain the member 14 in the position shown.

Shown located between the arms of the U-shaped member is an energizing coil 15. The coil 15 consists of a suitable number of turns of wire and is connected to a source of frequency 16 which provides a time varying signal at a desired rate.

Also located about member 14 is a coil 17 which, as will be explained, is a pickup coil and is useful in providing an output for developing a signal according to the principles of this invention. Additionally shown are two coils 18 and 19 respectively associated with the poles 11 and 12 and shunted by resistors 20 and 21. The coils 18 and 19, as will be explained, can be employed to balance the circuit or to further provide means for impressing additional drive signals to further accomplish balancing.

Essentially, the structure shown in FIG. 1 comprises a magnetic circuit. When a signal is impressed across coil 15, magnetic flux lines are generated and in essence, consists of lines such as 22 which for purposes of explanation, travel in a clockwise direction through the pole 11, back down through the member 14 into the base of the magnet. Similarly, lines of flux such as 23 emanate from pole 12, travel through member 14 in a clockwise direction as manifested by the arrow associated with line 23.

There are, of course, other lines such as 25 which are referred to as fringe lines and basically exist due to the fact that the flux spreads out or fringes about the gap formed between the poles. This type of flux is sometimes referred to as leakage flux. Such effects are well known in the magnetic art and are not important to the considerations of operation of the magnetic circuit to be explained.

Essentially, the magnetic lines of flux through both poles of the structure shown are provided when an alternating signal is impressed across the drive circuit 15 via the oscillator 16. The flux lines alternate in opposite directions due to the fact that the polarity of the energizing signal varies with time as, for example, a sinusoidal signal. It thus can be seen that if the member 14 were positioned exactly at the neutral axis between the pole pieces, there would be no net signal developed across the coil 14 due to the fact that the magnetic lines of flux would always be equal and opposite through the member 14 and hence, there would be no net signal developed across the coil 17 associated with the member 14.

It is, of course, understood as explained above, that the positioning of member 14 at the neutral axis can be accommodated by many simple mechanical techniques. Thus, as explained above, if member 14 were positioned between the poles 11 and 12 by means of a deformable elastomeric material, one could actually move or align the member and monitor the output across coil 17 until the net signal was zero and then be assured that the position of the same would be proper.

As one can readily understand, in a practical circuit, there is always an unbalance which is due to mechanical tolerances, material considerations and so on. This unbalance can be further accommodated, for example, by shunting the compensating coils 18 and 19 by resistors 20 and 21. In essence, these resistors upon adjustment, will serve to reduce the flux in one leg of the U-shaped member as compared to that in the opposite leg. Hence, by monitoring the output across coil 17 associated with member 14, one can then by varying resistors 20 and 21 accommodate a minimum signal across coil 17 and hence, balance the circuit in this manner.

There are numerous ways in which balance of the magnetic flux can be accommodated including the removal or addition of material to the legs of member 10 as well as increasing the number of turns of the drive coil 15 about the center line to obtain greater drive to one side of the magnetic structure as compared to the other. In any event, if the circuit shown in FIG. 1 were perfectly balanced in that the member 14 was positioned with respect to poles 11 and 12, then the lines of flux through member 14 would produce a zero output across the coil 17. It can, of course, be understood that the drive signal supplied by oscillator 16 via coil 15 could have a plurality of magnitudes and be a relatively large signal and the balance would be maintained as the voltage across coil 17 is purely a function of the balance of the magnetic circuit. Essentially, the lines of flux in a magnetic circuit follow the path of least reluctance. The reluctance is, of course, analgous to electrical resistance.

Figure 1A:
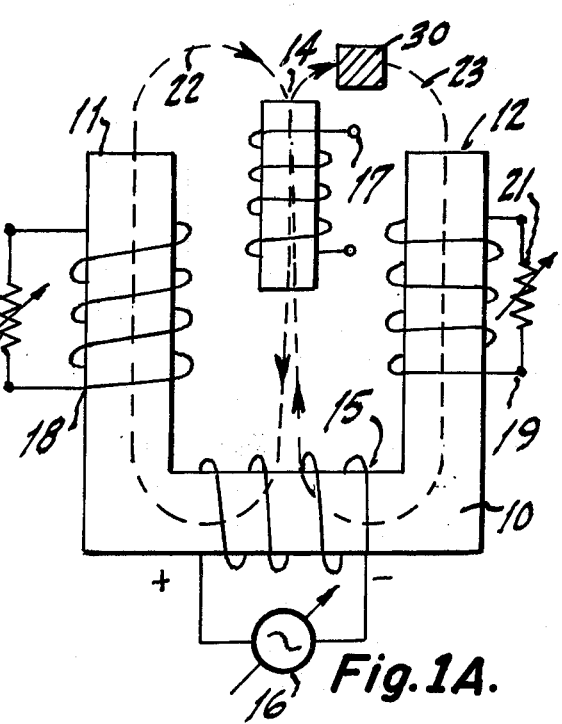

Referring to FIG. 1A, there is shown the same circuit as in FIG. 1 with the exception that there appears between the member 14 and pole 12, a piece of material 30. The material 30 is preferably magnetic material or magnetizable material and as will be explained, is indicative of the information to be stored on a suitable information carrying card.

If a piece of magnetic material as 30 is inserted between or directly above the member 14 and the pole 12, the material in effect, serves to decrease the reluctance of the magnetic path and hence, causes a greater flux intensity to be directed through member 14 from the pole 12 of the magnet 10. This increase in flux is afforded through the dashed path designated as 23. Hence, by placing the magnetic material 30 in the manner shown in FIG. 1A, there is an unbalance of the circuit which causes a voltage to appear across coil 17. This voltage is as explained, due to the fact that the magnetic flux 23 is now greater than magnetic flux 22 hence producing a voltage across coil 17 which is indicative of the flux flow 23 through the member 14 as from the bottom to the top.

If the same exact magnetic member 30 were placed between the pole 11 and member 14 or as shown in the FIG., were positioned to the left, this would again cause an unbalance in the circuit and a voltage would be provided across coil 17 indicative of flux 22 in the opposite direction. Furthermore, based on the assumption that the circuit is balanced, it will be readily understood that the member 30 which serves to unbalance the circuit can be extremely small in regard to its physical characteristics.

As will be further explained, the magnitude of the signal across coil 17 is not important; as in regard to retrieving data from a card, all one is concerned with is to whether or not the signal that appears is indicative of a zero or a one and hence, the magnitude of the signal is of no particular consequence in such applications.

Figure 2:
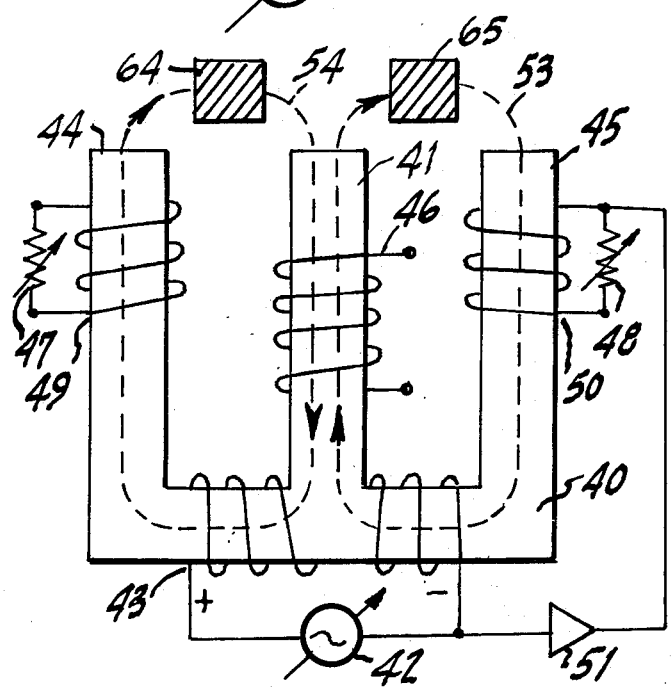
FIG. 2 is a diagrammatic view of an alternate embodiment of a magnetic curcuit.

Referring to FIG. 2, there is shown a similar magnetic structure as shown in FIG. 1 which, in essence, comprises an "E" shaped magnetic circuit 40. The difference between the magnetic circuit of FIG. 2 and that of FIG. 1 is that the center arm of the E 41 is mechanically and magnetically connected to the bottom portion. The bottom part of the E is again driven by an oscillator 42 which is coupled to a plurality of turns comprising a coil 43 for application to the magnetic circuit of a suitable drive signal.

Basically, the structure consists of a left handed pole 44 and a right handed pole 45. It is again noted that the center arm 41 of the E-shaped member should be positioned between the poles 44 and 45 such that the net flux flowing therethrough provides a zero voltage output across the coil 46 associated with the center arm 41.

It is, of course, understood that this circuit is more difficult to balance as one cannot change the relative position of 41 with respect to poles 44 and 45. However, as explained above, one has the option of reducing the drive in one arm as compared to the other by varying the resistors as 47 and 48 associated with the compensating coils 49 and 50, or by other means.

In FIG. 2, there is also shown an additional amplifier 51 having its output coupled to coil 50 by way of example. This is to again indicate that one can also balance the circuit by increasing the drive across one half of the circuit as compared to the other. Accordingly, FIG. 2 shows an additional drive being provided to the right hand side of the circuit to create more intense flux lines 53 in the center arm 41 as compared to those flux lines 54.

It is, of course, understood that any reference to direction is arbitrary as long as the flux lines between the two halves of the magnetic circuit are opposite. This is accomplished by driving the coil 43 or coil 15 of FIG. 1 by a sinusoidal or similar signal. It is evident that such a signal produces a positive level at one end of the transformer with a corresponding negative level at the other end of the transformer.

Figure 3:
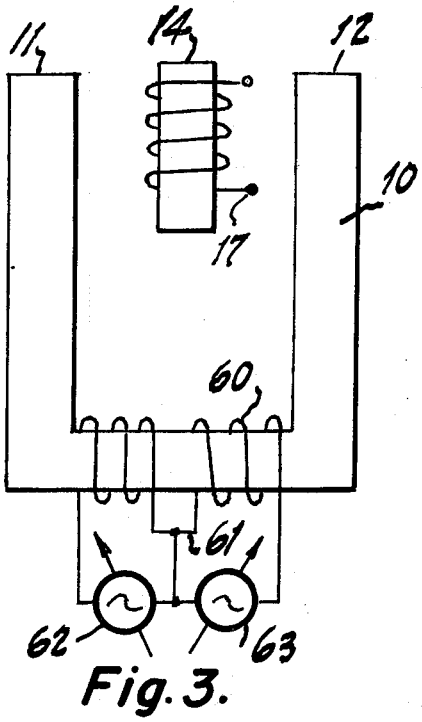
FIG. 3 is a diagrammatic view of another embodiment of a magnetic circuit with a differential exciting means.

It is also apparent by referring to FIG. 3 for example, that a magnetic circuit such as 10 with a suitable positioned pickup coil 17 arranged about a member 14 can also be driven by a differential type circuit as shown in FIG. 3. Hence, FIG. 3 shows a winding 60 about a center portion of the U which connects the pole piece 11 to the pole piece 12. The winding has a center tap 61 and each side is driven by two distinct sources as 62 and 63. The sources 62 and 63 provide signals of the same frequency but of opposite polarity. Hence, when signal 62 is positive, signal 63 is negative. In this arrangement, balance can be further afforded by adjusting the amplitude of signal 62 with respect to signal 63 without changing the frequency, or by controlling the number of turns of coil 60 between the center tap to enable one side of the magnetic circuit to be driven with a greater flux intensity than the other side as again determined by the constraints afforded by mechanical unbalance.

Referring again to FIG. 2, there is shown two separate pieces of magnetic material 64 and 65. The member 64 is located between the pole 44 and the center arm 41 while member 65 is located between the center arm 41 and the pole 45. Essentially, if the circuit were perfectly balanced and the members 64 and 65 were positioned exactly at the same place as shown and were mechanically congruent, there would be again no voltage developed across the pickup coil 46.

One can readily ascertain that if the member 65 were removed, a voltage would be developed across the pickup coil 46 indicative of the flux lines 54. Alternately, if member 64 were removed, a voltage would be developed across coil 46 indicative of the flux lines 53. Hence, it can now be clearly shown that the voltage due to the removal of the member 64 would be of a polarity determined by the flux lines 54 and represent a time varying signal of a given phase. The voltage developed across coil 46 indicative of the removal of member 65 would produce the same frequency signal but of opposite phase or a signal which is 180° out of phase with the above noted signal.

This therefore clearly specifies the ability of the circuit to distinguish between a magnetic member located on the left as compared to a magnetic member located on the right and hence, the presence of magnetic material on the left could constitute a binary one while the presence of magnetic material on the right would constitute a binary zero or vice versa. This then therefore enables one to accurately and reliably determine information on a credit carrying card where the information consists of magnetizable material positioned on the card such that the same when placed above a magnetic circuit as shown in FIGS. 1 to 3, constitutes a binary one or zero depending on whether the material appears on the left or right side of the center member of the magnetic circuit as 14 or 41 of the above noted figures.

Thus referring to FIG. 4, there is shown a credit card or information carrying card 70. In order to more fully explain the operation of the circuit, there is shown located beneath the card a top view of three magnetic circuits as above described designated respectively as 71, 72 and 73. The magnetic circuits each consist of a structure as shown in FIGS. 1 to 3 and comprise a right and a left pole and a center piece as 14 or 41. In order to clarify the situation, the reading head 71 has been referenced with the numerals employed in FIG. 1 for the corresponding parts.

The credit card 70 as will be explained, appears as a conventional credit card and in essence, may be fabricated from any of the plastic materials presently employed. The credit card is dimensioned according to conventional considerations and has thereon a series of channels labelled Cl, Cs and Cn. It is noted that the number of channels is shown only by way of example as three, but in practicality, a typical credit card can accommodate many more channels.

In essence, each channel on the card is associated with a plurality of bits shown as square land areas. In order to describe the operation of the circuit in regard to the card, the description will be limited to one channel C1.

Channel C1 is associated with a plurality of information bits 72. Each information bit is located about a center line 73 which in essence, is predetermined by the position of the member 14 on the reading head. Thus, when the card 70 is inserted into a slot or a card reader, as will be further described, each bit 72 appears either between the center piece 14 and the right pole 12 or between the center piece 14 and the left pole 11. Thus as described above, depending upon the positioning of the bit, this causes an unbalance of the magnetic circuit and provides a signal across the pickup coil associated with the member 14; which signal is of a specified phase indicative of a one or a zero.

Hence, for present purpose, it will therefore be assumed that bits on the card 70 which are located to the left of center line 73 are indicative of a binary one and bits which are located on the right side of the center line are indicative of a binary zero. Hence, the bits are designated as 72L for the one and 72R for the zero. It is again noted that the number of bits in the column C1 can vary from those shown in the drawing.

It is also noted that the actual deposition of the magnetic material on the card representative of a bit as 72 can be extremely small due to the fact that one seeks to determine an unbalance of the circuit.

Shown on the center of the card 70 is another channel indicated as CS. This channel is a sync channel and as one can ascertain, the channel begins at the bottom of the card with a first bit 74 which appears on the left of the center line associated with the channel CS and then a bit 75 on the right of the center line. The remaining bits in the synch channel alternate from left to right as for example one, zero; one, zero; one, zero and so on. Each bit in the synch channel is aligned with the placement of an information bit in the information channel. Thus, one can employ the synch channel to retrieve the data from the card for each column on the card.

On the other side of the synch channel by way of example, is a further information channel designated as CN to indicate, of course, that the number of information channels can vary and for example, a single card may contain ten or more information channels with a synch channel as CS.

Shown in FIG. 5 is a cross-sectional view of a typical credit card. The card may contain a first top layer 80 of a clear vinyl plastic material. The next layer would be fabricated from a white vinyl or an opaque plastic material. The various bits which are shown in FIG. 4 as 72 and so on are then deposited or otherwise secured to the white layer by glue, embedding, embossing, heating adhesive, epoxy or another suitable bond. The material comprising the bits may be a magnetic ink such as that used in coding checks, a metal foil, or may be magnetic particles. The material as 72 is impressed between layer 81 and the other layer 82 which may also be an opaque plastic layer. Layer 82 is covered by a bottom layer 83 of a clear vinyl.

As can be seen, the card which is extremely thin and on the order of a typical credit card, has embedded in the center the magnetic information or bits as shown in FIG. 4; which information is laminated or secured between the layers as 81 and 82. In this manner and due to the fact that the material deposited on the card is very small in volume, one would have an extremely difficult time in attempting to disassemble the card to determine the nature of the information stored. Furthermore, when one would be presented with a credit card shown, there would be no visual indication to the user as to what information is contained.

It is, of course, understood that the credit card could employ typical graphic information on the surfaces of layers 81 and 82 such as the name of the user, numbers and so on and hence, the information carrying card would be completely conventional in appearance with the exception that the magnetic bits or information would be buried or located within the depths of the card and between the layers as shown.

It is also understood that the vinyl plastic layers which comprise the card do not affect magnetic fields and magnetic waves can penetrate through the card. It is also important to note as previously explained, that the magnetic information bits or land areas such as 72 as located on the card, do not contact the magnetic circuits as shown, but merely have to be positioned within the reader in proximity to the head so that the lines of flux emanating from the poles are intercepted by the magnetic particles.

Referring to FIG. 6, there is shown a block diagram of a card reader which operates in conjunction with a card as shown in FIG. 4 and with a magnetic circuit reading head as shown and described in FIGS. 1 through 3.

Each channel on the card as C1 to CN is associated with a reading head designated as 90 for C1, 91 for C2 and 93 for CN. The synch channel CS also has an appropriate magnetic reading head designated as 94. The information carrying card 70 is inserted into a slot associated with the card reader. It is of course, understood that as the user inserts the card, it is pushed within the slot and caused to traverse the heads.

As explained above, there is a bit of information for each synch bit, to be decoded on the card in regard to the synch channel. Thus, as shown in FIG. 3, the synch bits as alternating define each row as B1,B2...BN of information. Hence, for each data row there is a synch bit on the card.

As indicated, the synch bits alternate from left to right about the center line of the reading head associated with the synch channel. Thus, the synch head 94 is coupled to an amplifier 95. The output of the amplifier is coupled to a counter 96. The counter 96 is a conventional binary counter and advances one state for each pulse received. Hence, as the card is being urged across the synch head 94, the counter 96 provides a number of pulses indicative of the number of rows as B1 through BN on the card. The output from the counter 96 is decoded by suitable gates as 97 to provide the row signals B1 through BN. Suitable outputs from the counter indicated as C1 through CN are also provided for purposes of noise immunity to define the number of columns on the card as C1 to CN.

There is shown an oscillator 100 which in essence, consists of the driving oscillator as shown in FIG. 1 for example as 16. Oscillator 100 may be a sinusoidal oscillator or an astable multivibrator and is used to generate the excitation voltage for the drive coils associated with the magnetic read heads 90 to 94. An output from the oscillator is also coupled to the counter to further synchronize the counter to the drive signal in order to develop suitable strobes for the data.

Hence, as can be ascertained, each time a synch pulse is provided, the appropriate data bit associated with each column is also now located above the read head as 90 to 93 associated with that column and that bit. Each read head such as 90 is coupled to a suitable high gain amplifier as 101. The gain of the amplifier 101 can be arranged for each channel and so on. The output of the amplifier 101 is coupled to a gate 102 which has another input furnished from counter 96 and indicative of the column such as C1 through CN.

The output from gate 102 is coupled to a comparator circuit 103. The circuit 103 may be an ordinary phase comparator and hence, has a reference signal input obtained from oscillator 100.

As clearly indicated above, the phase of the output signal from the head 90 is strictly determined by whether the magnetic bit on the card is located to the left or the right of the center line associated with the pickup coil. Hence, the comparator 103 produces either a positive phase signal or a negative phase signal depending on whether the bit is at the left or the right of the center line as determined for example, by a 72L bit as compared to a 72R bit (FIG. 4).

Coupled to the output of comparator 103 are two AND gates 104 and 105. AND gate 104 receives an A strobe which is indicative of a positive phase signal, while AND gate 105 receives a B strobe indicative of a negative phase signal. The outputs of the gates 104 and 105 are applied to a shift register 106. The shift register 106 contains a stage for each row in the column as B1 through BN. There is a shift register for each channel on the card and the shift registers are advanced by the decode gates associated with the synch channel. Hence, as the card traverses the heads, the shift register associated with the channel stores a bit for each row and will therefore contain a number of binary zeroes and ones after the reading of the card.

The outputs from each shift register as 106 are then decoded in a typical decoding network 107 and can be displayed or further utilized by a display or output module 108. It is understood that there are numerous ways of retrieving the data according to the data format on the card. It is well within the knowledge of one skilled in the digital field to implement such circuitry in numerous alternate ways.

In any event, one can see that a major aspect of the above noted system is in the magnetic circuit which is used to read the data on the card. The importance of this is the fact that the resultant signal which is retrieved by the read head strictly depends upon balance of the magnetic circuit and hence, one can use extremely high amplification of the read head signals without affecting the signal to noise ratio. The advantage of such a technique allows the system to render the interpretation of a one or a zero according to one of two different signals rather than measuring signal strength.

It is further understood that because one is only concerned with an unbalance due to the presence of the magnetic material as affecting the inherent balance of the magnetic read head, one can use large amplification factors as indicated above which can vary from channel to channel according to the characteristics of the particular head in each channel and be assured that the interpretation of the one or the zero is correct.

Furthermore, the magnetic circuit depicted has general utility in detecting the presence of magnetic material without coacting with the same and hence, can be used in other applications as metal detecting and so on. These and other objects will become apparent to those skilled in the art and are deemed to be encompassed within the spirit and scope of the invention by referring to the claims appended hereto.

I claim:

1. Apparatus for retrieving information on an information carrying member, said carrying member having at least one magnetic land area located thereon and positioned a predetermined distance from a reference line on said member, comprising:
   (a) a magnetic circuit of a "U" shaped configuration having a right vertical arm defining a first pole and a left vertical arm defining a second pole, said first and second arms joined together by the horizontal base member of said "U", said first and second poles separated one from the other by a given distance determined by the length of said bottom horizontal base,
   (b) exciting means coupled solely to said base member for driving said magnetic circuit to provide flux lines between said poles,
   (c) first and second windings, with said first winding positioned about said right vertical arm and said second winding positioned about said left vertical arm, balancing means coupled across said windings to determine the amount of flux through one arm as compared to the other,
   (d) pickup means positioned between said poles and located at a distance from one pole with respect to the other, said distance manifesting a position to cause said means to intercept said flux lines to cause a zero electrical signal to be developed across said means at said position,
   (e) means positioning said carrying member in the proximity of said magnetic circuit to cause said magnetic land area to affect said flux lines between one of said poles and said pickup means to provide across said pickup means, a signal indicative of the position of said land area with respect to said reference line.

2. The apparatus according to claim 1 wherein said pickup means comprises a magnetic member positioned between the arms of said "U", said member including a wire coil wound about said member and operative to provide an electrical signal thereacross according to the magnitude of the net flux lines passing therethrough.

3. The apparatus according to claim 1 wherein said exciting means for driving said magnetic circuit includes a source of alternating current adapted to excite said circuit by providing flux lines from said first pole to said pickup means in a clockwise direction and from said second pole to said pickup means in a clockwise direction.

4. The apparatus according to claim 1 further comprising phase detector means coupled to said pickup means and responsive to said exciting means to provide at an output, a signal indicative of the position of said land area with respect to said reference line.

5. A data storage and retrieval system comprising in combination a reading device and a credit card, said reading device comprising a magnetic circuit of a "U" shaped configuration having a right vertical arm defining a first pole and a left vertical arm defining a second pole, said first and second arms joined together by the horizontal base member of said "U", pickup means located between said poles and positioned to provide at an ouput a zero electrical signal when said poles are energized, first and second balancing windings with said first winding positioned about said right vertical arm and said second winding positioned about said left vertical arm, balancing means coupled across said windings to determine the amount of flux directed through one arm as compared to the other to enable said pickup means to provide said zero electrical signal, means coupled solely to said horizontal base member for energizing said magnetic circuit, said card comprising at least one magnetic land area, said card being positionable in said reading device so that said land area is located in proximity with said poles and said pickup coil to affect said magnetic field to cause an unbalance, said reading device including means coupled to said pickup means to determine the nature of said unbalance according to the positioning of said land area with respect to said magnetic circuit.

6. A magnetic circuit for responding to the presence of a magnetic material in the vicinity thereof, comprising:
   (a) a magnetic circuit member having a right arm defining a first pole and a left arm defining a second pole, said magnetic circuit member of a "U" shaped configuration and having said right vertical arm and said left vertical arm coupled together by a horizontal base member,
   (b) exciting means coupled solely to said base member for driving said magnetic circuit to provide a flux path in each of said arms and in the same direction,
   (c) first and second windings with said first winding positioned about said right arm and said second winding positioned about said left arm, balancing means coupled across said winding to determine the amount of flux through one arm as compared to the other,
   (d) pickup means located between said poles and positioned to intercept flux lines from each of said poles to provide at an output, a first electrical signal indicative of a balance of flux lines from each of said poles as effected by said balancing means,
   (e) means for positioning said magnetic material in proximity with said magnetic circuit member to unbalance said flux lines with respect to one of said poles and said pickup means to cause said pickup means to provide a second signal indicative of the position of said material with respect to said magnetic circuit member, whereby when said magnetic material is between said pickup means and said first arm, said second signal manifests a first logic condition and when said magnetic material is between said second arm and said pickup means, said second signal manifests another logic condition.

7. The magnetic circuit according to claim 6 wherein said magnetic material is positioned in proximity between said first pole and said pickup means.

8. The magnetic circuit according to claim 6 wherein said magnetic material is positioned in proximity between said second pole and said pickup means.

* * * * *